July 23, 1929.　　　J. L. PORTER　　　1,721,831
MANHOLE COVER
Filed Jan. 26, 1929
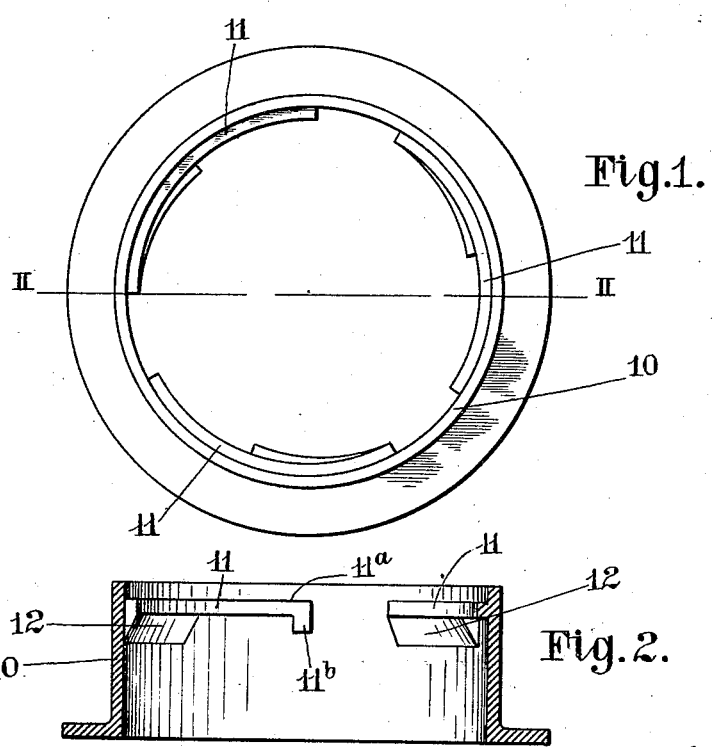
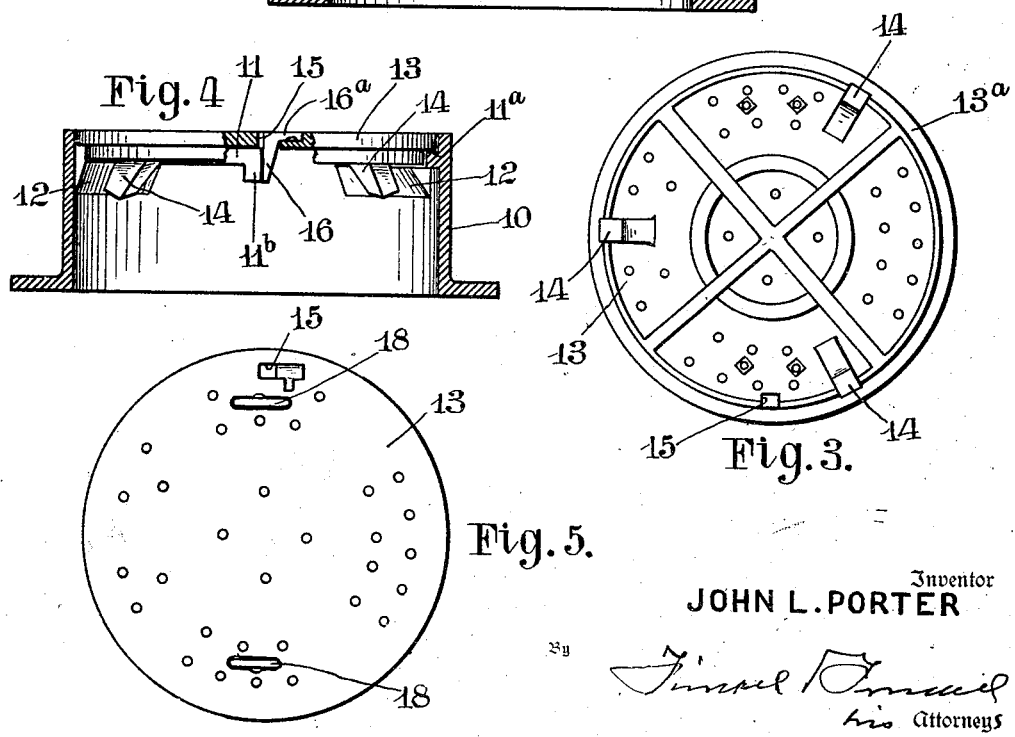
Inventor
JOHN L. PORTER
By
his Attorneys Patented July 23, 1929.

1,721,831

UNITED STATES PATENT OFFICE.

JOHN L. PORTER, OF COLUMBUS, OHIO.

MANHOLE COVER.

Application filed January 26, 1929. Serial No. 335,267.

This invention relates more especially to manhole covers such as are used in streets, sidewalks and other places to afford access to underground conduits, sewers, cisterns and the like.

In many of the covers heretofore produced or proposed no provisions, as far as I am aware, has been made to secure such covers from all movement when in position, and traffic over them, as by automobile, horse drawn vehicles and even walking of persons on them, has given rise to many disagreeable noises and at all times of the day and night because of the looseness of the cover in such seat.

The principal object of the present invention is to provide means whereby the cover is secured in its seat or base in such a way as to prevent its movement either horizontally, vertically or tiltingly and thereby prevent the noises referred to. Other objects will appear from the disclosure.

The invention is embodied in the example herein shown and described, the features of novelty being finally claimed.

In the accompanying drawing—

Figure 1 is a top plan view of the base or ground member.

Fig. 2 is a section on the line II—II Fig. 1.

Fig. 3 is a plan view looking at the lower side of the cover.

Fig. 4 is a sectional view like Fig. 2 showing the cover applied with a portion in section.

Fig. 5 is a plan view of the upper side of the cover.

In the views 10 designates the base member which is usually of cast iron and cylindrical in form with a flange at the bottom. This base member is usually set in the ground or pavement with its upper edge flush with the surface of the pavement. The interior wall of the base has cast with it near its upper end three inwardly projecting arcuate ribs 11 similar to one another and equally spaced apart. These ribs form the seat at $11^a$ for the cover. The corresponding end of each of these ribs has formed with and as a part of it a downward wedge shape projection with a face 12 that inclines from its upper portion downward toward the inner wall of the base. The cross section of this projection gradually increases in thickness centripetally as it approaches to or near the middle of the rib where it terminates. These wedge shape projections are made as nearly identical with one another as practicable.

13 designates the cover which is of circular form, the lower side of the margin of which at $13^a$ fits on the seats $11^a$ of the base. The lower side of the cover has formed with it three identical tongues 14 equidistantly spaced from one another. These tongues slant outward so as to reach under the faces 12 of the wedge shaped projections when the cover is seated on the seats $11^a$ and the cover given a sufficient turn to the right. In the early portion of the turn to the right the tongues do not contact with the faces 12 of the wedge shaped projections but as the turning is continued contact is established and as the larger ends of the projections are approached a wedging effect is obtained, such wedging effect tending to draw the cover tightly downward on its seat.

Because of the engagement of the tongues with the faces 12 not only is the cover drawn down on the seats $11^a$ but the horizontal movement or any other movement of the cover is prevented except an intentional reverse movement of the cover anti-clockwise.

To lock the cover on its seats $11^a$ after it has been turned to the right as far as designed an angular key having one leg 16 of wedge shape is put through a hole 15 in the cover to abut against the end of one of the ribs 11 while its other leg $16^a$ lies in a socket at the upper side of the cover. This key can be lifted out whenever desired by any suitable pointed instrument inserted in a lateral socket in the leg $16^a$ to permit the cover to be turned leftward to remove it.

The right hand ends of the ribs 11 are enlarged downwardly as at $11^b$ to prevent the tongues from passing under the ribs 11 if it is attempted to turn the cover the wrong way.

A pair of handles 18, 18, adapted to be drawn up as regards the cover can be used to lift the cover off its seats.

Because with this construction the cover cannot move in relation to its seats in the base, the travel of vehicles over it cannot cause any disagreeable noise.

The forms of the parts can be changed without departing from the gist of the invention as claimed.

What I claim is:

1. A manhole device including a base, an inwardly projecting cover seat, a wedge shaped projection below said seat and a cover provided with a tongue reaching under said seat to engage said wedge shaped projection and adapted when turned thereunder to draw down the cover and effect horizontal tightness of the cover in relation to the base.

2. A manhole device including a base, an inwardly projecting cover seat, a wedge shaped projection below said seat and a cover provided with a tongue reaching under said seat to engage said wedge shaped projection and adapted when turned thereunder to simultaneously draw down the cover and effect horizontal tightness of the cover in relation to the base.

3. A manhole device including a base, an inwardly projecting cover seat, a horizontally tapering wedge shaped projection having a downwardly inclined face below said seat, and a cover provided with a tongue reaching under said seat to engage said wedge when the cover is turned to lock said cover from movement when traversed by traffic.

4. A manhole device including a base provided with a cover seat and centripetally enlarged projections, and a cover to fit on said seat and having projections to engage said centripetally enlarged projections.

JOHN L. PORTER.